J. B. TOSELLI.
Apparatus for Freezing.
No. 78,159.
Patented May 19, 1868.
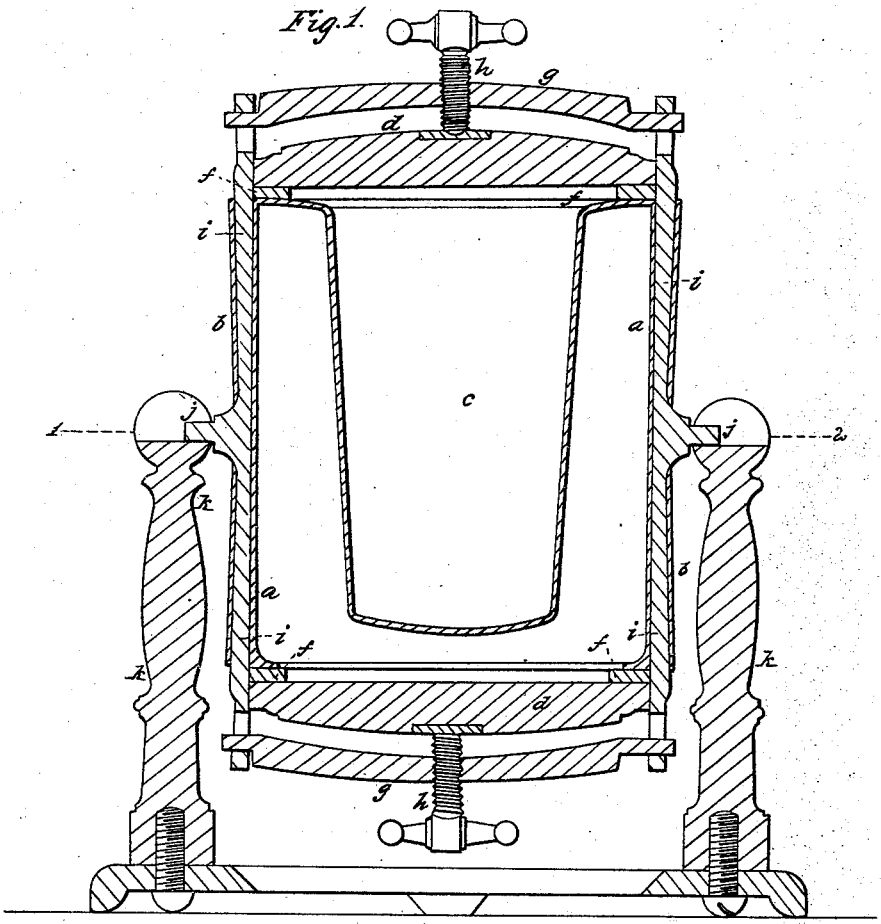
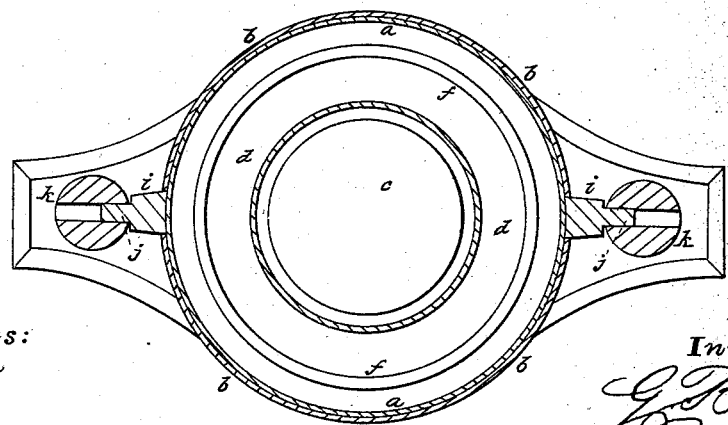
Witnesses:
Inventor:

UNITED STATES PATENT OFFICE.

JEAN BAPTISTE TOSELLI, OF PARIS, FRANCE.

IMPROVED APPARATUS FOR FREEZING.

Specification forming part of Letters Patent No. 78,159, dated May 19, 1868.

*To all whom it may concern:*

Be it known that I, JEAN BAPTISTE TOSELLI, of Paris, France, have invented a new and Improved Method of Freezing and Cooling Liquids; and I do hereby delare that the following is a full, clear, and exact description thereof, which will enable others skilled in the art to make and use the same, reference being had to the accompanying drawings of an apparatus employed in the process of refrigeration, forming part of this specification.

This invention relates to an improved method of freezing and cooling water and other liquids; and the apparatus employed for the purpose consists in a metal cylinder or vessel, for containing liquids to be congealed or cooled, inclosed in another metal cylinder or vessel, and surrounded by chemical refrigerating substances properly prepared, the said apparatus being so constructed and arranged that it can be rotated or oscillated for the purpose of thoroughly agitating and changing the position of all portions of the refrigerating-liquids to act rapidly upon all parts of the liquids to be congealed or cooled, as hereinafter more particularly described.

The apparatus of my invention which I have employed for this purpose is illustrated in the accompanying drawings, in which—

Figure 1 is a central vertical section. Fig. 2 is a transverse or horizontal section through the line 1 2.

Similar letters of reference indicate corresponding parts.

An external metallic cylinder, $a$, incloses a metallic cylinder, $c$, with a space between them for containing the refrigerating substances or liquids for congealing or cooling liquids to be placed in the cylinder or interior vessel, $c$. For greater efficiency the external cylinder, $a$, is wrapped in a jacket, $b$, of wool, or other suitable non-conducting material, to prevent the radiation of heat inwardly.

The ends of the external cylinder, $a$, are closed by thick wooden lids or covers $d\ d$, packed with india-rubber rings $f\!f$, and secured by set-screws $h\ h$, for drawing down tightly the cross-bars $g\ g$ on the sides or covers $d\ d$.

On the sides of the cylinder $a$ are arms $i\ i$, provided with trunnions $k\ k$, for oscillating or rotating the whole apparatus, which may be effected with a crank attached to one of the journals $j$.

It will be seen that this refrigerating apparatus may be variously modified in its form and arrangement without deviating from the essential principle of my invention, which is the application of chemical refrigerating substances by means of an apparatus so constructed and operated that by its movement all portions of the liquid to be congealed or cooled shall be agitated and rapidly interchanged in contact with the surface of a vessel surrounded by the refrigerating chemical substances.

An apparatus for this purpose may be adapted to different circumstances and needs, and especially in a portable form to the sudden demands of a battle-field to congeal or cool a small quantity of water for the immediate use of a patient.

It is well known to scientific men that by uniting together one volume of water in weight with one volume of subcarbonate of soda and one volume of nitrate of ammonia a reduction of temperature is obtained of $+50$ to $-2$, or $84°$ Fahrenheit. But I have discovered that a much greater reduction of temperature may be obtained by the combination of these chemical ingredients in the following manner, viz.: Mixing together, first, one volume of water and one volume of subcarbonate of soda for the space of three minutes, or until thoroughly combined, and then adding to this mixture one volume of nitrate of ammonia, whereby a reduction of temperature takes place equal to $91°$ Fahrenheit. This method of mixing and combining the refrigerating chemicals is therefore much more effective in congealing liquids; for, whereas the reduction of temperature by the ordinary known method of combination of these chemicals would not be below $32°$, and would therefore be insufficient for producing ice artificially, by my improved method of successively mixing and combining the chemical ingredients, the temperature is reduced several degrees below $32°$, and is therefore effective in the production of ice artificially, when properly applied with an apparatus such as has been described.

Having thus described my invention, what I claim as new, and desire to secure by Letters Patent, is—

1. The method of congealing and cooling liquids by the application of the chemical refrigerating substances, substantially as herein described.

2. The successive mixture and combination of water and subcarbonate of soda with nitrate of ammonia, as and for the purpose herein described.

3. The apparatus herein described, or its substantial equivalent, for congealing and cooling liquids with chemical refrigerating substances, substantially as described.

J. B. TOSELLI.

Witnesses:
  T. W. DAVIDSON,
  DEMOS.